United States Patent
Parkvall

(10) Patent No.: US 8,660,082 B2
(45) Date of Patent: Feb. 25, 2014

(54) METHOD AND ARRANGEMENT IN A RADIO-ACCESS NETWORK

(75) Inventor: Stefan Parkvall, Stockholm (SE)

(73) Assignee: Telefonaktiebolaget L M Ericsson, Stockholm (SE)

(*) Notice: Subject to any disclaimer, the term of this patent is extended or adjusted under 35 U.S.C. 154(b) by 257 days.

(21) Appl. No.: 12/820,703

(22) Filed: Jun. 22, 2010

(65) Prior Publication Data

US 2011/0211551 A1    Sep. 1, 2011

Related U.S. Application Data

(60) Provisional application No. 61/308,385, filed on Feb. 26, 2010.

(51) Int. Cl.
*H04W 4/00*    (2009.01)
*H04W 4/18*    (2009.01)

(52) U.S. Cl.
USPC .......................................................... 370/330

(58) Field of Classification Search
USPC .......................................................... 370/330
See application file for complete search history.

(56) References Cited

U.S. PATENT DOCUMENTS

| | | | |
|---|---|---|---|
| 2009/0181690 A1 | 7/2009 | McCoy et al. | |
| 2009/0270095 A1* | 10/2009 | Heinonen et al. | 455/434 |
| 2010/0172311 A1* | 7/2010 | Agrawal et al. | 370/329 |
| 2010/0275083 A1* | 10/2010 | Nam et al. | 714/748 |
| 2011/0103296 A1* | 5/2011 | Ji et al. | 370/315 |
| 2011/0194412 A1* | 8/2011 | Park et al. | 370/241 |
| 2011/0299449 A1* | 12/2011 | Kwon et al. | 370/312 |

FOREIGN PATENT DOCUMENTS

| | | |
|---|---|---|
| WO | 2007084482 A2 | 7/2007 |
| WO | 2009029025 A2 | 3/2009 |

OTHER PUBLICATIONS

International Search Report and Written Opinion in corresponding International Application No. PCT/SE2010/050710, mailed May 2, 2011.

* cited by examiner

*Primary Examiner* — Abdullah Riyam
*Assistant Examiner* — Brian Cox
(74) *Attorney, Agent, or Firm* — Potomac Patent Group PLLC

(57) ABSTRACT

The invention relates to a method and arrangement for transmitting and receiving control information in a radio-access network. A network node transmits first control information in a first part and second control information in a second part of a time-frequency region that is transmitted after a control region in a subframe. The second part is located later in the subframe than the first part. The second control information may be less time-critical than the first control information. An intermediate node receives and decodes the first control information at the end of the first part. When the first control information indicates that the subframe comprises data payload to the intermediate node, the intermediate node receives and decodes the data payload. The intermediate node receives second control information at the end of the second part.

34 Claims, 9 Drawing Sheets

METHOD AND ARRANGEMENT IN A RADIO-ACCESS NETWORK

RELATED APPLICATION

This application is related to, and claims priority from, U.S. Provisional Patent Application Ser. No. 61/308,385, filed Feb. 26, 2010, entitled "R-PDCCH Multiplexing" to Stefan Parkvall, the entire disclosure of which is incorporated herein by reference.

TECHNICAL FIELD

The present invention generally relates to a method and an arrangement in a radio-access network and, more particularly, to transmitting control information in a subframe from a network node to an intermediate node.

BACKGROUND

At its inception radio telephony was designed, and used for, voice communications. As the consumer electronics industry continued to mature, and the capabilities of processors increased, more devices became available to use wireless transfer of data and more applications became available that operate based on such transferred data. Of particular note are the Internet and local area networks (LANs). These two innovations allowed multiple users and multiple devices to communicate and exchange data between different devices and device types. With the advent of these devices and capabilities, users, both business and residential, found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughput to end user devices are under discussion and development. For example, the so-called 3GPP Long Term Evolution (LTE) standardization project also known as Evolved UTRAN (E-UTRAN) standardization is intended to provide a technical basis for radio communications in the decades to come. Among other things of note with regard to LTE systems is that they will provide for downlink communications, i.e. the transmission direction from the network to the mobile terminal, using orthogonal frequency division multiplexing (OFDM) as a transmission format and will provide for uplink communications, i.e. the transmission direction from the mobile terminal to the network, using single carrier frequency division multiple access (SC-FDMA).

Cellular networks such as LTE systems are foreseen to cover diverse geographic regions. On the one hand they are anticipated to cover urban areas with a high density of buildings with indoor users, while on the other hand cellular networks should also provide access over large geographic regions in remote rural areas. In both scenarios it is challenging to cover the entire service area. Either huge parts are heavily shadowed from the Base Station (BS) or the link distances are very large so that radio propagation characteristics are challenging.

In order to cope with diverse radio propagation conditions, multi-hop communication has been proposed. By means of intermediate nodes, e.g., relays, the radio link is divided into two or more hops, each with better propagation conditions than the direct link. This enhances link quality which leads to increased cell edge throughput and coverage enhancements.

Relaying is considered for LTE-Advanced, also called 3GPP Release 10, as a tool to improve e.g. the coverage of high data rates, group mobility, temporary network deployment, the cell-edge throughput and/or to provide coverage in new areas. The relay node (RN) is wirelessly connected to the radio-access network via a donor cell controlled by a donor eNodeB (eNB). The RN transmits data to/from user equipments (UEs) controlled by the RN using the same air interface as an eNB, i.e. from a UE perspective there is no difference between cells controlled by a RN and an eNB.

In LTE data transmissions to/from a UE are under strict control of the scheduler located in the eNB or RN. Control signalling is sent from the scheduler to the UE to inform the UE about the scheduling decisions. This control signalling, comprising one or several Physical Downlink Control Channels (PDCCHs) as well as other control channels, is transmitted at the beginning of each subframe in LTE, using 1-3 OFDM symbols out of the 14 OFDM symbols available in a subframe for normal Cyclic Prefix (CP) and bandwidths larger than 1.8 MHz. For other configurations the numbers are slightly different. Downlink scheduling assignments, used to indicate to a UE that it should receive data from the eNB or RN, occur in the same subframe as the data itself. Uplink scheduling grants, used to inform the UE that it should transmit in the uplink, occur a couple of subframes prior to the actual uplink transmission.

Since the relay's transmitter causes interference to its own receiver, simultaneous eNB-to-RN and RN-to-UE transmissions on the same frequency resource may not be feasible unless sufficient isolation of the outgoing and incoming signals is provided e.g. by means of specific, well separated and well isolated antenna structures. Similarly, at the relay it may not be possible to receive UE transmissions simultaneously with the relay transmitting to the eNB. In particular, it may not be feasible for an intermediate node such as a relay to receive control information from a network node such as an eNB while transmitting control information in control signals to UEs controlled by the intermediate node.

SUMMARY

It is therefore a first object of at least some of the embodiments of the present disclosure to provide a mechanism for enabling transmission of control information from a network node in a radio-access network to an intermediate node that is intermediate between the network node and a user equipment in the radio-access network.

A second object according to some of the embodiments is to enable transmission of the control information in a manner that makes efficient use of the time-frequency resources in a subframe.

A third object according to some of the embodiments is to make the control information available to the intermediate node in a way that enables the intermediate node to timely decode data payload transmitted to the intermediate node in the subframe.

An additional object of further embodiments of the present disclosure is to provide solutions for control signalling between the network node and the intermediate node that are transparent to the user equipment.

According to a first embodiment of the present disclosure, at least some of these objects are achieved by a method in a network node for transmitting control information in a subframe from the network node to an intermediate node in a radio-access network. The control information is comprised in a time-frequency region that is transmitted after a control region in the subframe. The control region is transmitted in a beginning of the subframe. The control region may be used for control signalling to user equipments.

The network node transmits first control information in a first part of the time-frequency region and transmits second control information in a second part of the time-frequency region. The time-frequency region is divided so that the second part is located later in the subframe than the first part. The second control information may be less time-critical than the first control information.

According to a second embodiment of the present disclosure, at least some of these objects are achieved by a network node that comprises a transceiver. The transceiver is adapted to transmit control information in a subframe from the network node to an intermediate node in the radio-access network. The control information is comprised in the time-frequency region that is transmitted after the control region in the subframe. The control region is transmitted in the beginning of the subframe. The control region may be used for control signalling to user equipments.

The transceiver is adapted to transmit first control information in the first part of the time-frequency region and second control information in the second part of the time-frequency region. The time-frequency region is divided so that the second part is located later in the subframe than the first part. The second control information may be less time-critical than the first control information.

According to a third embodiment of the present disclosure, at least some of the objects are achieved by a method in the intermediate node for receiving control information in the subframe from the network node in the radio-access network. The control information is comprised in the time-frequency region that is located after the control region in the subframe. The control region is located in the beginning of the subframe.

The intermediate node receives first control information in the first part of the time-frequency region. The intermediate node decodes the first control information. The decoding starts at or after an end of the first part of the time-frequency region. When the first control information indicates that the subframe comprises data payload to the intermediate node, the intermediate node receives and decodes the data payload. The intermediate node receives second control information in the second part of the time-frequency region.

According to a fourth embodiment of the present disclosure, at least some of these objects are achieved by an intermediate node adapted to receive control information in the subframe from the network node in the radio-access network. The control information is comprised in the time-frequency region that is located after the control region in the subframe. The control region is located in the beginning of the subframe. The intermediate node comprises a transceiver and a processor.

The transceiver is adapted to receive the first control information in the first part of the time-frequency region and to receive second control information in the second part of the time-frequency region.

The processor is connected to the transceiver and adapted to control transmission and reception performed by the transceiver. The processor is further adapted to decode the first control information. The processor is adapted to start decoding the first control information at or after an end of the first part of the time-frequency region.

When the first control information indicates that the subframe comprises data payload to the intermediate node, the transceiver is further adapted to receive the data payload and the processor is further adapted to decode the data payload.

The first and second control information may in some examples be transmitted during a silent period when user equipments connected to said intermediate node do not expect any transmissions from the intermediate node. The silent period follows in one example after a control signalling part in an MBSFN subframe.

The first control information may comprise downlink related information and the second control information may comprise uplink related information. The downlink related information may in some examples be scheduling assignments related to data transmission from the network node to the intermediate node. The uplink related information may for example be scheduling grants related to data transmission from the intermediate node to the network node.

By transmitting control information directed to the intermediate node in a time-frequency region that is transmitted, or in other words located in time, after the control region that is transmitted in the beginning of a subframe, the first object of the present disclosure is achieved in that the control information is transmitted at occasions when the intermediate node can receive the control information.

By transmitting a part of the control information that is time-critical in the first part of the time-frequency region and transmitting a part of the control information that is less time-critical in the second part of the time-frequency region, the second and third objects of the present disclosure are achieved. The second object is achieved in that the use of the time-frequency resources is more efficient than in some alternative solutions as the span of the time-frequency region used for transmitting the control information can be made more narrow in the frequency domain when the time-frequency region spans essentially until the end of the subframe, whereby less resource blocks are affected by the transmission of the control information to the intermediate node. The third object is achieved in that the intermediate node can receive and act upon time-critical information as soon as possible without having to wait until the end of the subframe.

By transmitting the control information during silent periods when the user equipments connected to the intermediate node do not expect any transmissions from the intermediate node the additional object is achieved in that the user equipments do not need to change their behaviour as they already are configured to ignore any information transmitted during silent periods.

An advantage of the present disclosure is that it introduces control signalling to nodes that act as intermediate nodes between a network node and a user equipment while the increase in latency in the decoding of data transmissions to the intermediate nodes is kept at a lower level than in some alternative solutions.

Another advantage is that there is no need to define further channels in order to make use of time-frequency resources located after the time-frequency region in the subframe, i e in the time domain, as is the case for some alternative solutions.

A further advantage of some embodiments of the present disclosure is that legacy user equipments can still function as expected.

Some of the embodiments described herein are particularly advantageous for use in systems where the intermediate node receives transmissions from the network node on the same frequency resource as the intermediate node uses for transmissions to its user equipments, especially in situations when the subframe structure is time aligned in cells controlled by the network node and cells controlled by the intermediate node.

DETAILED DESCRIPTION

Figure 1:
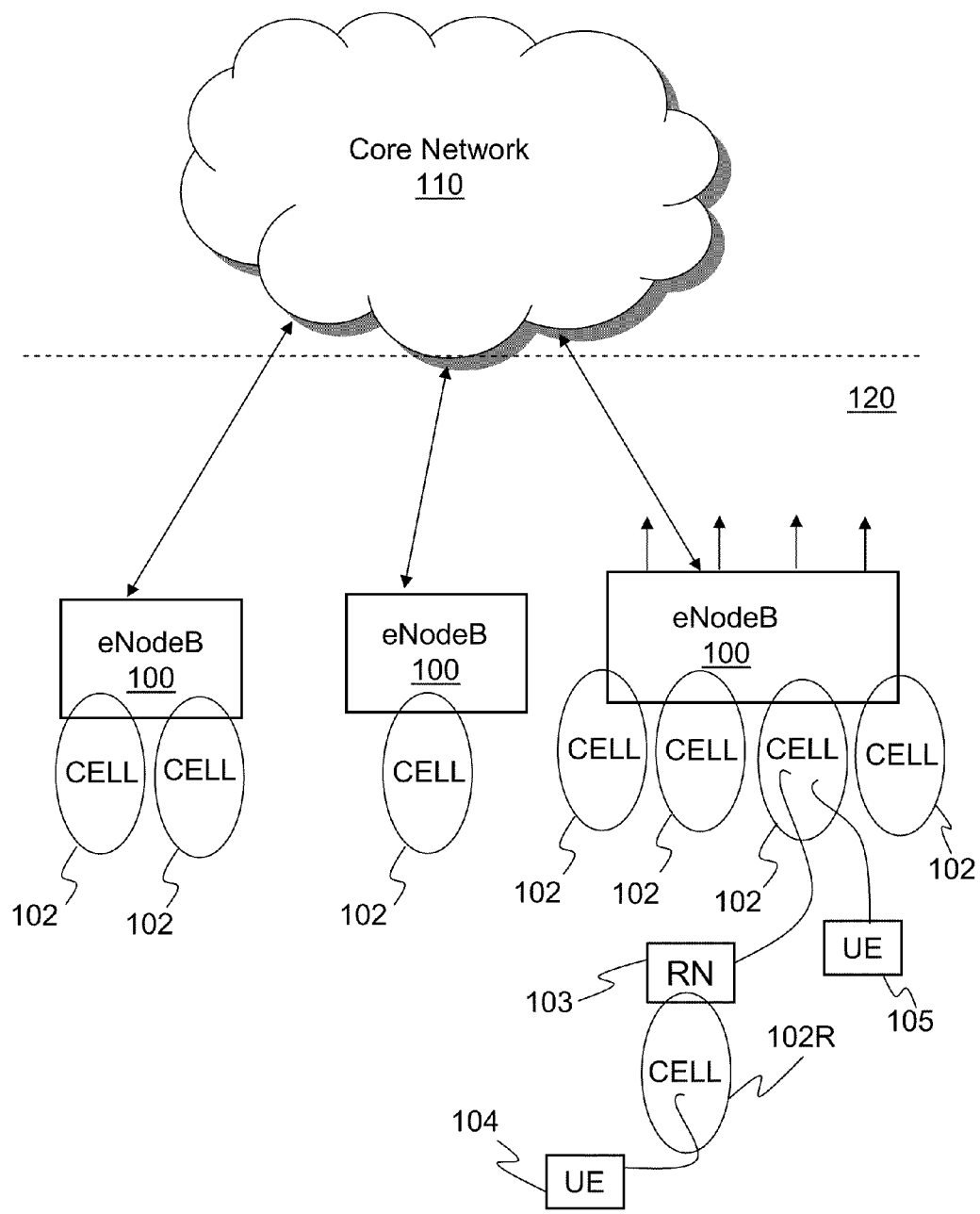
FIG. 1 is a schematic view illustrating a scenario in a radio-access network.

The following description of the exemplary embodiments of the present invention refers to the accompanying drawings. The same reference numbers in different drawings identify the same or similar elements. The following detailed description does not limit the invention. Although terminology from 3GPP Release 10 has been used in this disclosure and particular examples are provided in the context of LTE systems, the present invention is not limited in its applicability to LTE systems and can instead be used in any system wherein, for example, relays or other intermediate nodes between a network node and a user equipment are employed. For example, other wireless systems, including Wideband Code Division Multiple Access (WCDMA), Worldwide Interoperability for Microwave Access (WiMax), Ultra Mobile Broadband (UMB) and Global System for Mobile Communications (GSM) systems, may also benefit from exploiting the ideas covered within this disclosure.

According to at least some of the embodiments of the present disclosure solutions for transmission of control information from a network node in a radio-access network to a node that acts as an intermediate node between the network node and a user equipment are provided. The intermediate node is wirelessly connected to the radio-access network via a cell controlled by the network node. The user equipment is wirelessly connected to the radio-access network via a cell controlled by the intermediate node. Other user equipments may be wirelessly connected to the radio-access network via the cell controlled by the network node. Transmissions between the nodes and between the nodes and the user equipments are carried out in subframes. To avoid overlap in time with control signalling to the user equipments, which occurs in a control region in the beginning of a subframe, the control information to the intermediate node may be transmitted in a time-frequency region that occurs later in the subframe, i e at a time after the transmission of the control region.

The inventor has realized that one part of the control information, for example downlink assignments, may be more time-critical in that it needs to be acted upon by the intermediate node in the subframe where it is transmitted, and that another part of the control information, for example uplink grants, may be less time-critical in that it does not need to be acted upon in the subframe where it is transmitted, but in a subframe that is to be transmitted at a later time. This property of the control information is used in the embodiments described herein for keeping latency in the decoding of data payload at the intermediate node at as low level as possible by transmitting the more time-critical part of the control information, denoted first control information, in a first part of the time-frequency region in the subframe, that occurs earlier in time than a second part of the time-frequency region. The above mentioned property of the control information further enables efficient use of the time-frequency resources in the subframe in that the less time-critical part of the control information, denoted second control information, can be transmitted in the second part of the time-frequency region, as this part of the control information does not need to be available to the intermediate node as soon as possible in the subframe. Thereby the solutions of the embodiments in the present disclosure are further efficient in that they enable a more simple overall structure of the subframe, where no further channels need to be defined in order to make use of the time-frequency resources available in the subframe.

To provide some context for the more detailed discussion of the herein described embodiments, consider first the exemplary radio communication system illustrated in FIG. 1. Therein a radio-access network 120 is configured to communicate with a core network 110 within the radio communications system. Since the example in FIG. 1 is provided in terms of LTE, the network node which transmits and receives over the air interface is termed an eNodeB, several of which eNodeBs 100 are illustrated therein.

In the context of the air interface, each eNodeB 100 is responsible for transmitting signals toward, and receiving signals from, one or more cells 102. Each eNodeB 100 according to this exemplary embodiment includes multiple antennas, e.g., 2, 4, or more transmit antennas, as well as potentially multiple receive antennas, e.g., 2, 4, or more receive antennas, and handles functions including, but not limited to coding, decoding, modulation, demodulation, interleaving, de-interleaving, etc., with respect to the physical layer of such signals. Note that, as used herein, the phrase "transmit antennas" is specifically meant to include, and be generic to, physical antennas, virtual antennas and antenna ports. The applicability of the embodiments of this disclosure is however independent of the number of transmit and receive antennas. Further, the embodiments are also applicable to an environment where a network node such as the eNodeB 100 and/or an intermediate node such as a relay 103 only has one transmit antenna and/or one receive antenna. The eNodeBs 100 are also responsible for many higher functions associated with handling communications in the system including, for example, scheduling users, handover decisions, and the like. According to exemplary embodiments, a UE 104 which is operating in a cell 102R as shown in FIG. 1 will transmit and/or receive signals via a relay node (RN) 103 and, similarly, an anchor or donor eNodeB 100 will transmit and/or receive signals to/from UE 104 via the relay node 103. The donor eNodeB 100 may further transmit and/or receive signals to/from UE 105 which is directly connected to the eNodeB 100.

LTE-Advanced, i e 3GPP Release 10, will support a new control channel, the Relay Physical Downlink Control Channel (R-PDCCH), which is transmitted later in the subframe than the normal control signalling to user equipments at the beginning of the subframe. An R-PDCCH carries, similarly to a PDCCH, either an uplink grant or a downlink assignment. Multiple R-PDCCHs, and possibly other control channels defined for relay operation, can be transmitted and the time-frequency region where these are transmitted is referred to as a "R-PDCCH region" herein. The R-PDCCH region will typically not occupy the full system bandwidth during a subframe and the remaining resources can be used for transmission of data to UE and/or RNs.

Multiplexing the R-PDCCH with other transmissions in the downlink subframe from the donor eNB can be performed using either frequency division multiplexing (FDM) or a combination of FDM and time division multiplexing (TDM).

Figure 2A:
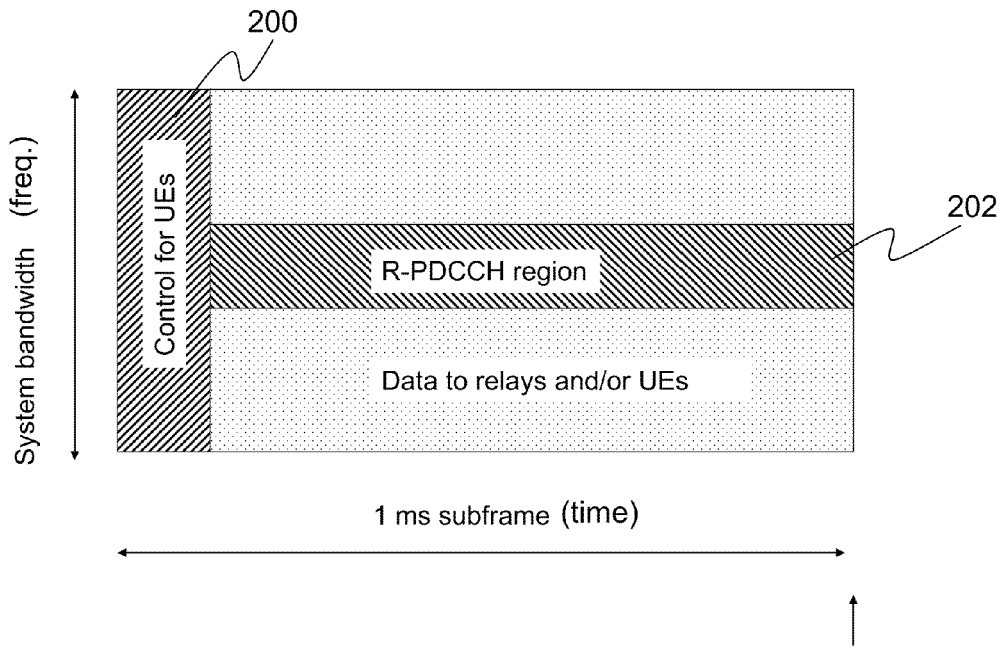
FIG. 2A is an illustration of an example of a subframe structure.

Considering first the possibility of using just FDM to multiplex the R-PDCCH data with other data in the subframe containing the R-PDCCH, using FDM the R-PDCCH transmission will start as soon as the RN is capable of receiving transmissions from the eNB, i.e. after the control region 200 in a subframe as shown in FIG. 2A. This may either be directly after the control region 200 or possibly somewhat later to allow for switching from transmission to reception in the relay. In this case, the R-PDCCH region 202 spans the remaining part in time of the subframe, i.e. the transmission of the R-PDCCH ends at the end of the subframe, or possibly somewhat earlier to allow for switching between reception and transmission in the relay.

Using FDM, as illustrated in FIG. 2A, is beneficial as there is no need to define an R-PDSCH channel, further described below in connection to FIG. 2B. To avoid this simplifies the system. However, when using solely FDM, the R-PDCCH control signaling cannot be decoded until the end of the subframe, which may increase the latency in the decoding of data transmission to the RN as the control information in the R-PDCCH is needed prior to decoding of the data payload.

Figure 2B:
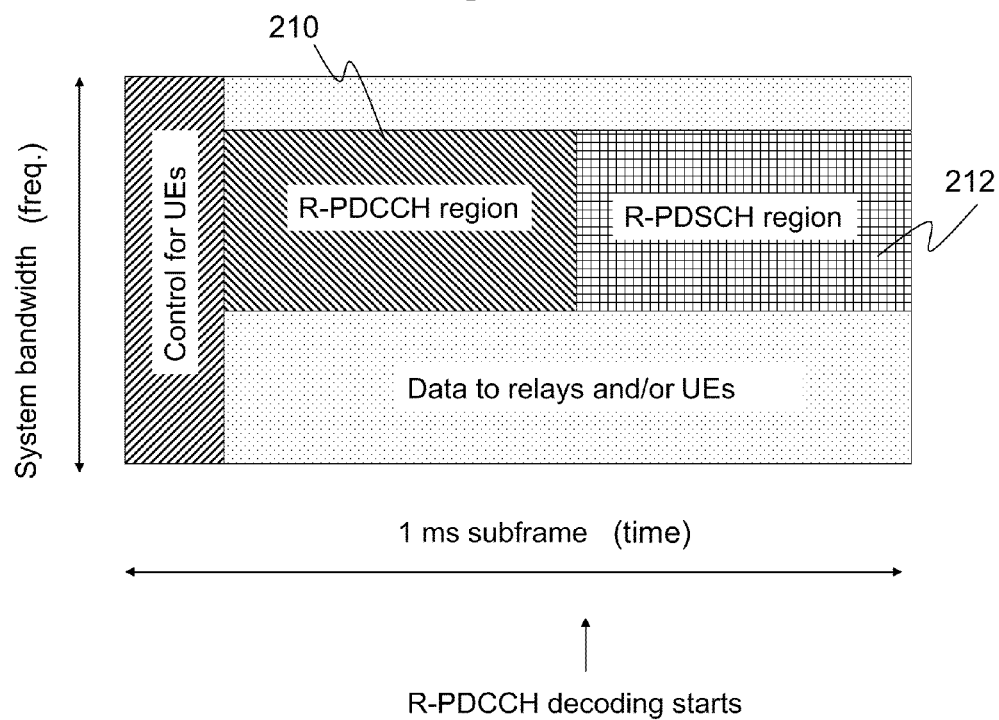
FIG. 2B is an illustration of another example of a subframe structure.

Another alternative is to use both FDM+TDM to multiplex the R-PDCCH data with other data in the subframe containing the R-PDCCH, in which case the start of the R-PDCCH 210 is the same as in the FDM approach as seen in FIG. 2B. However, the end of the R-PDCCH transmission is significantly earlier in the subframe than in the FDM approach, which can be seen by comparing FIG. 2A with FIG. 2B, implying that there will be downlink resources 212 in the subframe following the R-PDCCH. Those resources can be used, for example, to transmit eNB-to-RN data and is referred to as the Relay Physical Downlink Shared Channel (R-PDSCH) herein. Note that the R-PDSCH cannot be used for eNB-to-UE transmissions, at least not for legacy UEs, as no R-PDSCH is currently defined in the LTE specifications. Also, note that in the FDM+TDM approach, the R-PDCCH region spans a larger frequency bandwidth than in the FDM approach, assuming the same number of bits on the R-PDCCHs, as it is shorter in time. Using FDM+TDM in combination, as illustrated in FIG. 2B, allows the R-PDCCH to be decoded earlier than in the FDM case, which is beneficial from a latency perspective, but on the other hand this approach requires the definition of an R-PDSCH to exploit the resources 212 after the R-PDCCH region 210 and may lead to inefficient resource utilization. Legacy UEs would not be able to process the R-PDSCH and when scheduling such UEs, the time-frequency region otherwise used for the R-PDSCH would therefore have to be left empty.

The drawbacks of the potential subframe structures discussed above with reference to FIGS. 2A and 2B are overcome by a subframe structure according to at least some embodiments of the invention, which will now be discussed with reference to FIG. 3. Similarly to in the above potential subframe structures, the R-PDCCH transmission will start as soon as the RN is capable of receiving transmissions from the eNB, i.e. after the control region 200 in the subframe. This may either be directly after the control region 200 or possibly somewhat later to allow for switching from transmission to reception in the RN.

Figure 3:
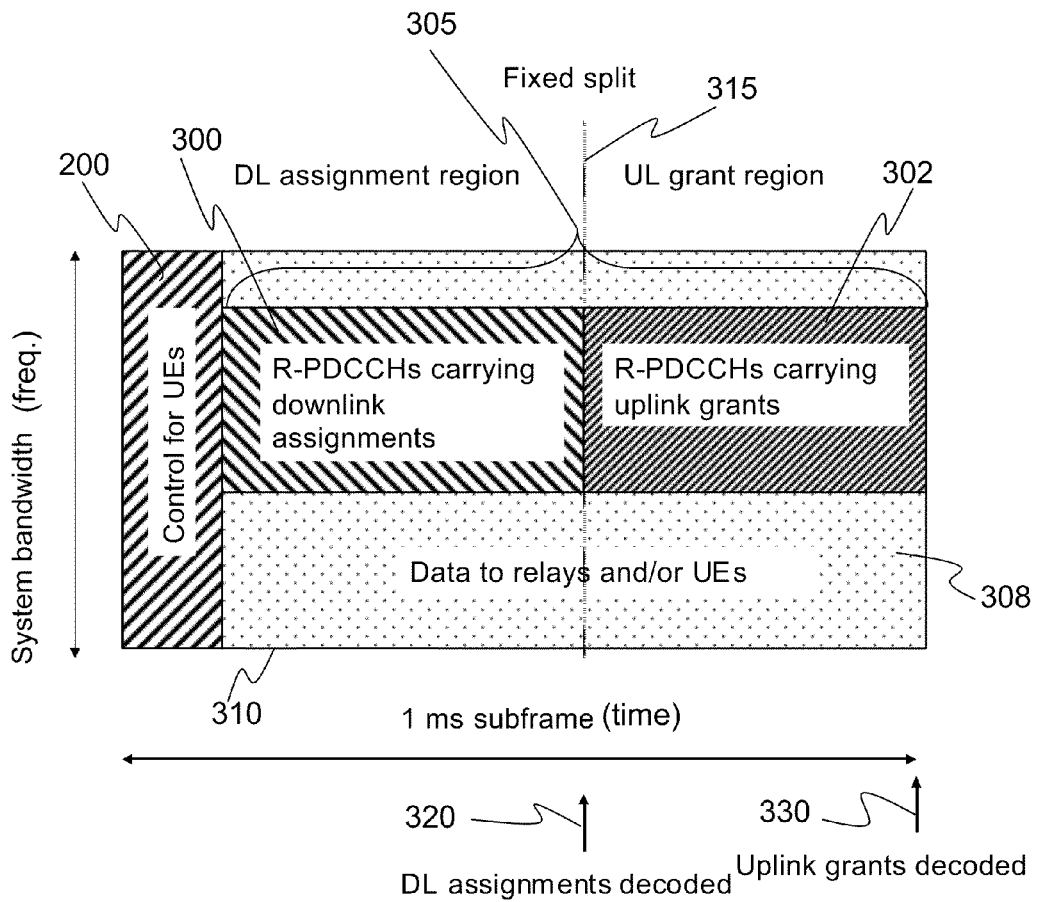
FIG. 3 is an illustration of a subframe structure according to at least some embodiments of the invention.

In the subframe structure of FIG. 3 the time-frequency region 305 referred to herein as the R-PDCCH region spans until the end of the subframe 310 in which the R-PDCCH data is being transmitted, with the possible exception of any OFDM symbols needed for switching in the RN, and is divided into two parts as shown in FIG. 3. The two parts are separated by a split 315 in time, i e in the time domain, into a first part 300 and a second part 302 of the time-frequency region 305. In some embodiments the split 315 may be a fixed split, i e the position of the split in the subframe is fixed. In other embodiments, the split 315 may be configurable or adaptable depending on the control information to be transmitted. For example, the split may be configurable or adaptable depending on the respective amounts or sizes of downlink related information and uplink related information to be transmitted in subframes in a system. The length in time of the first and second parts 300, 302 of the time-frequency region 305 may be specified as a first and a second number of OFDM symbols, specifying the lengths of the first and second parts of the time-frequency region respectively.

In the first part 300 of the time-frequency region, located early in the subframe 310 according to an embodiment, R-PDCCHs containing downlink related information are transmitted. The downlink related information may for example be scheduling assignments and, if defined, hybrid Automatic Repeat reQuest (ARQ) acknowledgements. In the second part 302, located later in the subframe 310 than the first part, R-PDCCHs containing uplink related information such as scheduling grants are transmitted. In a further example, the uplink related information transmitted in the second part may also comprise hybrid ARQ acknowledgements. These hybrid ARQ acknowledgements may for example be transmitted by the eNodeB 100 in response to information transmitted by the RN 103 in response to a scheduling grant. Such a hybrid ARQ acknowledgement may be an indication to the RN 103 that the information transmitted has been received properly, or that the information needs to be resent by the RN 103 to the eNodeB 100.

The first part 300 of the time-frequency region may also be referred to as a Downlink (DL) assignment region and the second part 302 of the time-frequency region may also be referred to as an Uplink (UL) grant region. With this subframe structure, downlink related information such as DL assignments, also referred to as scheduling assignments or downlink scheduling assignments, may be decoded at or after the end 320 of the DL assignment region or first part 300 of the time-frequency region 305. Or in other words, the downlink related information may be decoded when the first part 300 of the time-frequency region 305 ends. Similarly, uplink related information such as UL grants, also referred to as scheduling grants or uplink scheduling grants, may be decoded at or after the end 330 of the UL grant region or second part 302 of the time-frequency region 305, which may also be the end of the subframe 310. Or in other words, the uplink related information may be decoded when the second part 302 of the time-frequency region 305 ends or when the subframe 310 ends.

Note that uplink related information may be transmitted in the first region 300, i e the first part 300 of the time-frequency region 305, as well if not all available resources in the region 300, i e the first part 300, have been used for downlink related information. Further, it should be noted that the time-frequency region 305 spans about the same frequency bandwidth as the R-PDCCH region 202 of the FDM approach shown in FIG. 2A, assuming the same number of bits on the R-PDCCHs, as the time-frequency region 305 spans about the same length in time as that of the FDM approach. As the time-frequency region 305 does not span the full system bandwidth during the subframe, the remaining frequency resources 308 in the subframe, which are outside the time-frequency region 305, can be used for transmission of data to UEs and/or RNs.

With this structure illustrated in FIG. 3, the latency benefit of having downlink assignments available early in the subframe as in the FDM+TDM approach shown in FIG. 2B is achieved. Furthermore, no R-PDSCH or other channel needs to be defined, thereby simplifying the overall structure to a level of complexity similar to that of the FDM approach shown in FIG. 2A, as the later part of the subframe is used for uplink grants, which are less time-critical from a latency perspective.

In many applications, it is desirable to time align, possibly within a small offset, the subframe structure in the cells controlled by the network node, e g the eNB 100, and cells controlled by the intermediate node, e g the RN 103, see FIG. 1. As a consequence of this, an intermediate node, such as the RN 103 in LTE, that receives transmissions from the eNB 100 on the same frequency resource as it uses for transmissions to its user equipments 104 cannot receive the normal control signalling from the eNB 100 at the beginning of a subframe as the RN 103 needs to transmit control signalling to the UE 104 in that part of the subframe. This problem is solved in 3GPP Release 10 by prescribing that L1/L2 control signalling from the eNB to the RN is transmitted later in the subframe, as mentioned earlier. Applying the subframe structure of the embodiments presented with reference to FIG. 3 above also has the effect that control signalling, i e control information, from the network node to the intermediate node is transmitted later in the subframe, i e at a later time within the subframe. Therefore, the embodiments of the present disclosure are applicable to applications where the subframe structure in the cells controlled by the network node and the subframe structure of the cells controlled by the intermediate node are time aligned. The applicability of the subframe structure presented with reference to FIG. 3 is however not limited to an environment where the subframe structure is time aligned between different cells in the radio-access network. For example, the subframe structure of FIG. 3 may be applied in a mixed environment, where subframe structures of some cells are time aligned, e g between a cell controlled by a network node and a cell controlled by an intermediate node that is wirelessly connected to the network node, whereas subframe structures of other cells are not time aligned. The subframe structure of FIG. 3 may further be applied in an environment where subframe structures are not time aligned between different cells.

When the intermediate node, e g the RN 103, receives transmissions from the network node, e g the eNodeB 100 on the same frequency resource as it uses for transmissions to its user equipments, the transmitter may cause interference to the receiver in the intermediate node.

Figure 4:
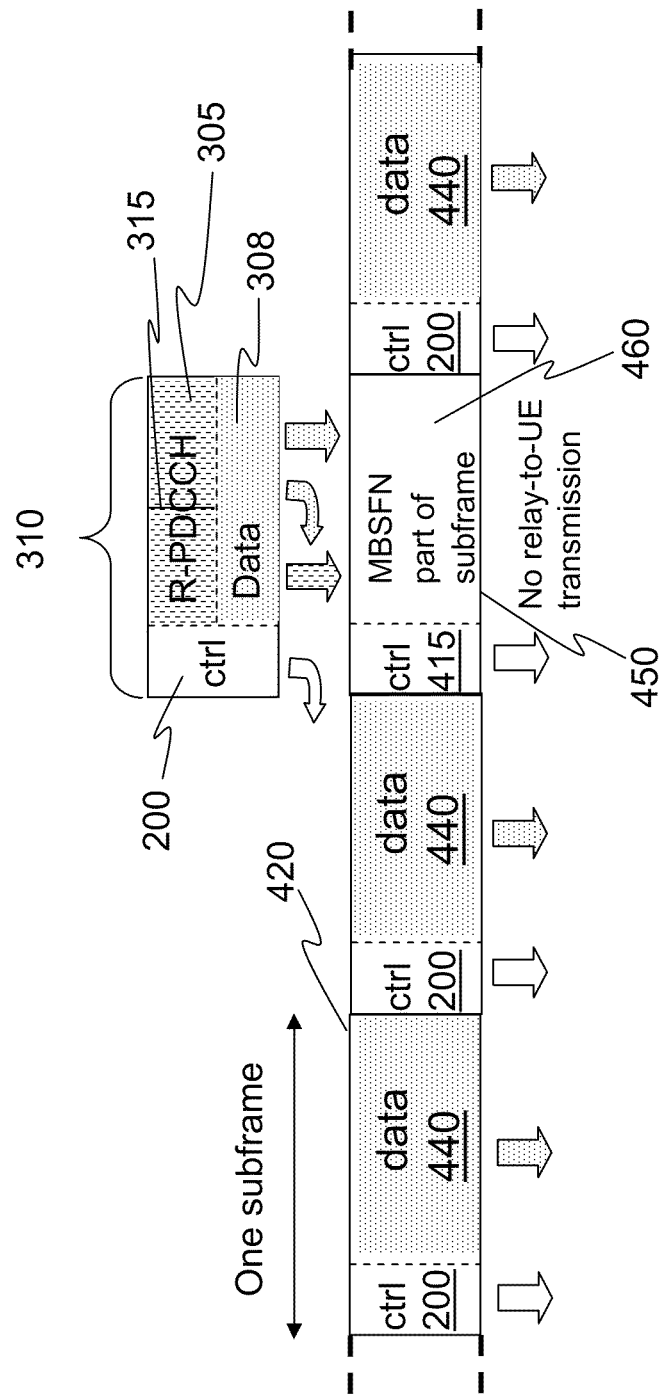
FIG. 4 is an illustration of a subframe structure according to an embodiment of the invention.

According to a further embodiment of the present disclosure, one possibility to handle the interference problem is to operate the relay or RN 103 such that the relay or RN 103 is not transmitting to terminals, e g UE 104, when it is supposed to receive data from the donor eNodeB 102, i.e. to create "gaps" in the relay-to-UE transmission, e g in the transmission from RN 103 to UE 104. These "gaps" during which terminals, including LTE Rel-8 terminals, are not supposed to expect any relay transmission, e g any transmission from the RN 103, can be created by configuring Multicast/Broadcast over Single Frequency Network (MBSFN) subframes as shown in FIG. 4. An MBSFN subframe 450 comprises a small control signaling part 415 at the beginning of the subframe, followed by a silent period 460 where the UEs do not expect any transmissions from the RN 103. This further embodiment has the advantage that the control signalling between the eNB 100 and the RN 103 has no impact on the behaviour of the UE 104 that is controlled by the RN 103. This embodiment is therefore compatible with legacy LTE terminals such as 3GPP Release 8 terminals.

In more detail, FIG. 4 illustrates a sequence 420 of subframes, comprising respectively a control region 200 and a data region 440, in which control signals and data are respectively transmitted by RN 103 to UE 104 as indicated by arrows under the sequence 420 of subframes. One subframe in the sequence 420 is an MBSFN subframe 450, during which control signals are transmitted from the RN 103 to UE 104 in the control signalling part 415 in the beginning of the MBSFN subframe 450. The control signalling part 415 is in essence identical to the control region 200 of non-MBSFN subframes. After the control signalling part 415 follows the silent period 460 in an MBSFN part of the MBSFN subframe, during which no transmission from the RN 103 to the UE 104 takes place.

FIG. 4 further illustrates a subframe 310 transmitted by the eNB 100 that in one embodiment coincides in time with the MBSFN subframe transmitted in the sequence 420 from the RN 103 to the UE 104. The subframe 310 is configured according to the subframe structure of FIG. 3, with a time-frequency region 305 where control information is transmitted from the eNB 100 to the RN 103. The time-frequency region 305 is divided into a first and a second part separated by a split 315 so that time-critical control information can be transmitted in the first part and less time-critical information in the second part, as earlier described in the context of FIG. 3. The subframe 310 further comprises a data region 308 where data is transmitted to RN 103 and/or to UEs 105 that are directly connected to the eNB 100. Control signals to UEs 105 that are directly connected to the eNB 100 are transmitted in the control region 200 in the beginning of the subframe 310. The transmissions from the eNB 100 to the RN 103 are indicated by straight arrows beneath the MBSFN subframe 310 in FIG. 4, and transmissions to UEs 105 that are directly connected to the eNB 100 are indicated by curved arrows.

The subframe 310 transmitted by the eNodeB 100 to the RN 103 may in other embodiments be an MBSFN subframe. RN-to-eNB transmissions, e g transmissions from RN 103 to eNB 100, can be facilitated through scheduling by not allowing any terminal-to-relay transmissions, e g transmissions from UE 104 to RN 103, in some subframes.

Figure 5:
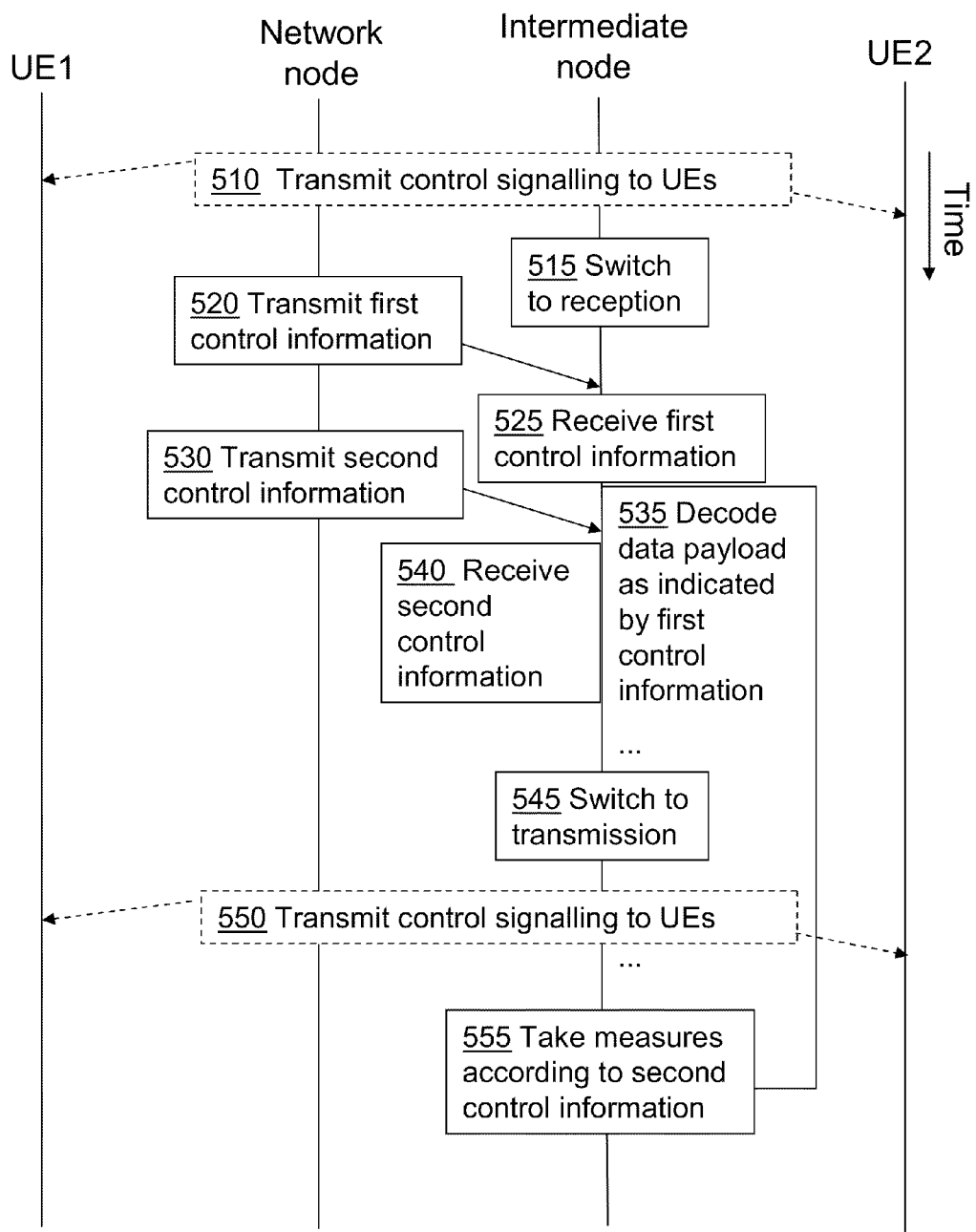
FIG. 5 is a combined flow chart and signalling scheme illustrating an embodiment of the invention.

The effects from applying an embodiment of the invention will now be described with reference to a combined flow chart and signalling scheme shown in FIG. 5. The combined flow chart and signalling scheme shows in more detail the actions performed during transmission of a subframe comprising control information from a network node, in this disclosure exemplified by the eNB 100, to an intermediate node, in this disclosure exemplified by the RN 103 of FIG. 1. The actions may be taken in another order than indicated in the flow chart, and the different actions may take longer or shorter time than shown in the flow chart. In a first block 510 the network node may transmit control signalling to user equipments directly connected to the network node. In the mean-time, at a time that may be the same or slightly different compared to a transmission time of the network node, the intermediate node may transmit control signalling to user equipments connected to the intermediate node. Then at block 515 the intermediate node switches from transmission to reception. At block 520 the network node transmits first control information, and at a block 525 the intermediate node receives the first control information. After transmitting the first control information, the network node transmits second control information at block 530. Meanwhile, the intermediate node, which has received the first control information, starts decoding the data payload transmitted in the subframe at a block 535, if the received first control information indicates that data directed to the intermediate node is transmitted in the subframe. While decoding the data payload, the intermediate node receives the second control information at block 540. Typically, the decoding at block 535 of the data payload continues also after the end of the second part of the time-frequency region and after the end of the subframe where it was received. Then at block 545 the intermediate node switches from reception to transmission, and at block 550 control signalling to UEs may be performed as earlier described, but in subsequent subframes of the network node and intermediate node respectively. Finally, at block 555 the intermediate node takes measures as indicated by the second control information.

Figure 6:
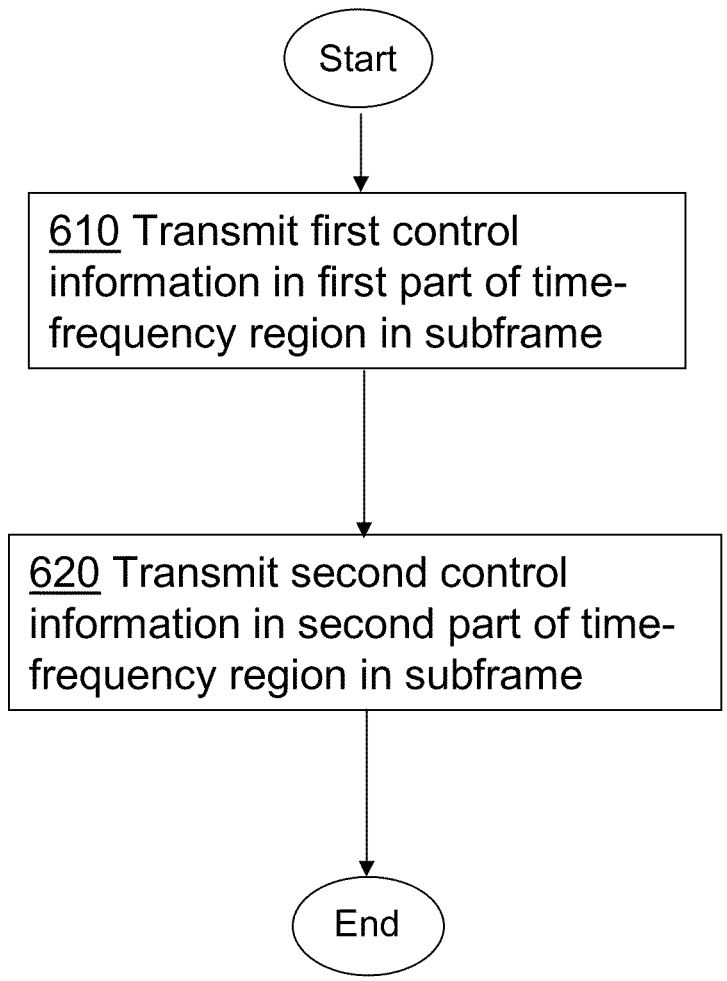
FIG. 6 is a flow chart illustrating a method according to an embodiment of the invention.

The method in the network node 100 for transmitting control information from the network node 100 to the intermediate node 103 in the radio-access network 120 will now be described with reference to FIG. 6. The control information is comprised in the time-frequency region 305 that is transmitted after the control region 200 in the subframe 310. The control region 200 is transmitted in the beginning of the subframe 310. The control region 200 may be used for control signalling to user equipments 105.

The time-frequency region 305 is divided so that the second part 302 of the time-frequency region 305 is located later in the subframe 310 than the first part 300 of the time-frequency region 305. The second part 302 may therefore be transmitted at a later time in the subframe 310 than the first part 300. The method comprises the following steps, which may be taken in any appropriate order:

Step 610. The network node 100 transmits first control information, comprising a time-critical part of the control information, in the first part 300 of the time-frequency region 305. The first control information may concern data that is transmitted in the subframe 310. The first control information may in further examples be needed by the intermediate node 103 prior to decoding of data payload in the subframe 310. The first control information may in some embodiments be downlink related information. In some examples, the downlink related information may be scheduling assignments. According to further embodiments, the uplink related information may be transmitted in the first part 300 if resources are available in the first part 300 that have not been used for downlink related information.

Step 620. The network node 100 transmits second control information, comprising a less time-critical part of the control information, in the second part 302 of the time-frequency region 305. The second control information is less time-critical than the first control information. The second control information may in some embodiments be uplink related information. In some examples, the uplink related information may be scheduling grants.

The first and second parts 300, 302 of the time-frequency region 305 may be separated by a split 315 in time, i e in the time domain, in the subframe 310. The split 315 may be a fixed split at a fixed position in the subframe 310 or an adaptable or configurable split, in which case the position in the subframe may be set e g at system configuration. According to further embodiments the first part 300 may comprise a first set of OFDM symbols that is subsequent to a reserved set of OFDM symbols, for example 1-3 OFDM symbols at the beginning of the subframe 310. The reserved set of OFDM symbols may be used for the control region 200. The second part 302 of the time-frequency region 305 may comprise a second set of OFDM symbols that is subsequent to the first set of OFDM symbols.

The frequency resource used for transmitting the control information by the network node 100 may in some embodiments be the frequency resource that is used also for the control signalling to user equipments by the intermediate node 103.

According to further embodiments, the time-frequency region 305 that is transmitted after the control region 200 in the subframe 310 may be a time-frequency region that is used for transmitting control channels defined for relay operation. In one example the control channels may be R-PDCCHs and the first and second control information may be signalled or transmitted in the R-PDCCHs.

In some additional embodiments, the first and second control information may be transmitted during a silent period 460 when user equipments 104 connected to the intermediate node 103 do not expect any transmissions from the intermediate node 103. In one example the silent period 460 follows after a control signalling part 415 in an MBSFN subframe 450.

The subframe structure may in further embodiments be time aligned in cells 102 controlled by the network node 100 and cells 102R controlled by the intermediate node 103.

In some embodiments the network node 100 may be a donor eNB and the intermediate node 103 may be a relay node that is wirelessly connected to the radio-access network via a donor cell 102 that is controlled by the donor eNB. In other embodiments, the network node 100 and the intermediate node 103 may be relay nodes wirelessly connected to the radio-access network via a donor cell controlled by a donor eNB. In further embodiments the intermediate node 103 may be a user equipment wirelessly connected to the radio-access network via a donor cell controlled by a donor eNB.

Figure 7A:
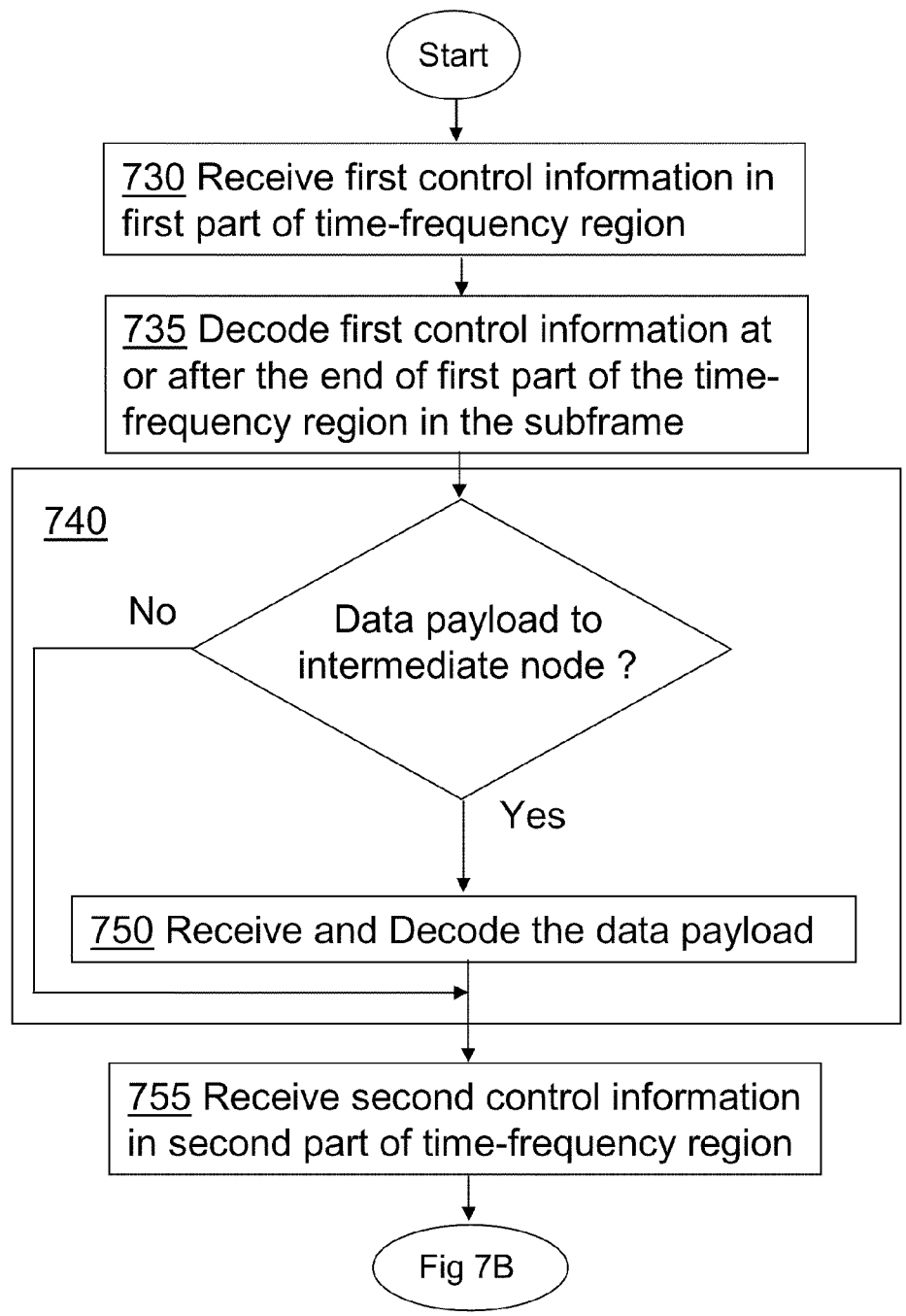
FIG. 7A is a flow chart illustrating a further method according to a further embodiment of the invention.

The method in the intermediate node 103 for receiving control information in the subframe 310 from the network node 100 in the radio-access network 120 will now be described with reference to FIG. 7A. The control information is comprised in the time-frequency region 305 that is located after the control region 200 in the subframe 310. The control region 200 is located in the beginning of the subframe 310. The method comprises the following steps, which may be taken in any appropriate order:

Step 730. The intermediate node 103 receives first control information, in the first part 300 of the time-frequency region 305. The first control information may concern reception of data that is comprised in the subframe 310. The first control information may in further examples be needed by the intermediate node 103 prior to decoding of data payload in the subframe 310. The first control information may in some embodiments be downlink related information. In some examples, the downlink related information may be scheduling assignments.

Step 735. The intermediate node 103 decodes the first control information. The decoding starts at or after an end 320 of the first part 300 of the time-frequency region 305.

Step 740. When the first control information indicates that there is data payload to the intermediate node 103 in the subframe 310, the intermediate node 103 receives and decodes in a Step 750 the data payload. In some embodiments some of the data payload may be decoded during the second part 302 of the time-frequency region 305.

Step 755. The intermediate node 103 receives second control information, in the second part 300 of the time-frequency region 305. The second control information may be less time-critical than the first control information. The second control information may in some embodiments be uplink related information. In some examples, the uplink related information may be scheduling grants. The second control information may concern uplink transmission of data to be comprised in another subframe.

Figure 7B:
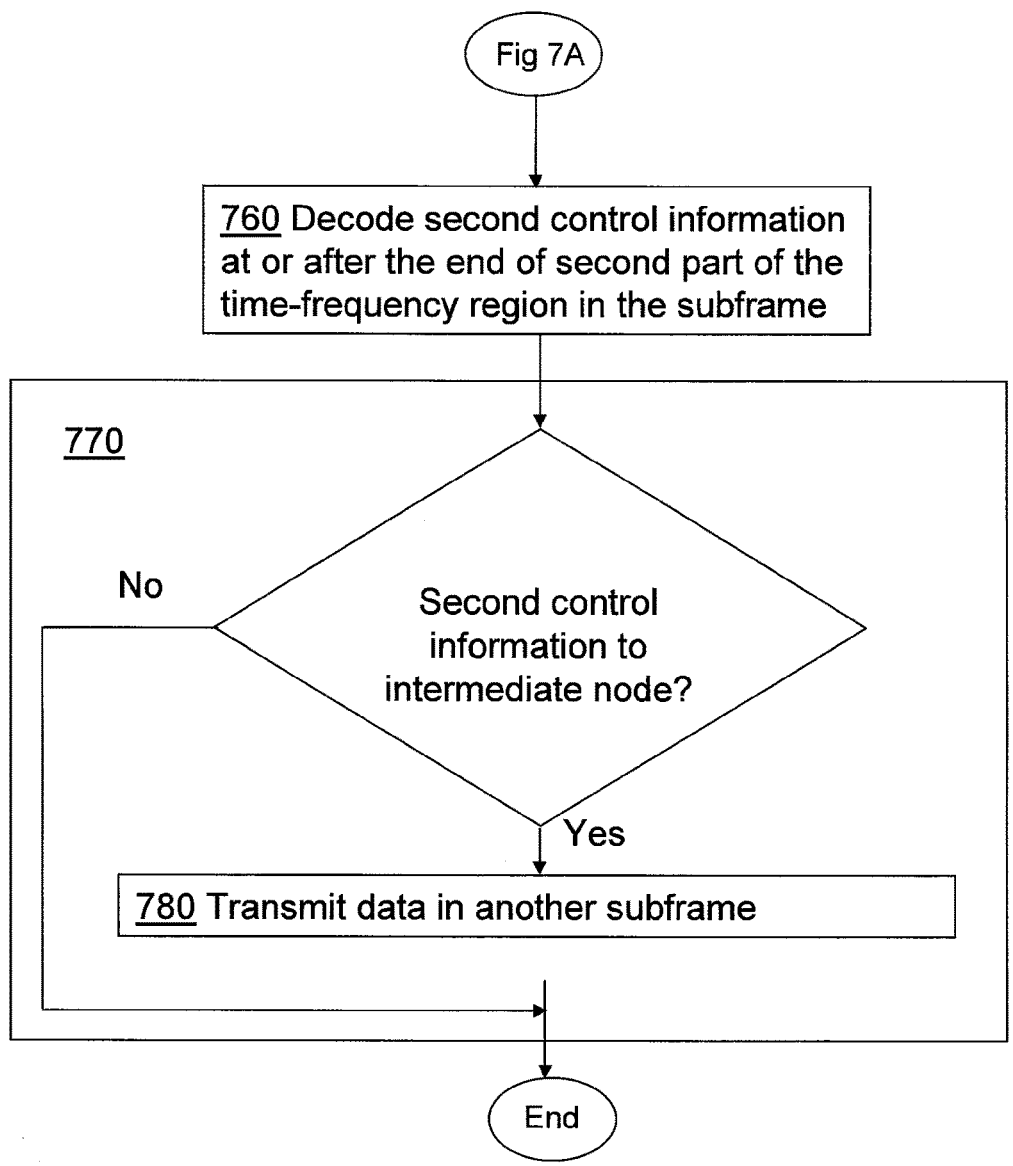
FIG. 7B is a flow chart illustrating further steps of the method according to another embodiment of the invention.

According to some embodiments, the method for receiving control information may further comprise the following steps, described with reference to FIG. 7B:

Step 760. The intermediate node 103 decodes the second control information. The decoding starts at or after an end 330 of the second part 302 of the time-frequency region 305. The second control information may concern uplink transmission of data to be comprised in another subframe.

Step 770. When the second control information indicates an uplink transmission opportunity for the intermediate node 103, the intermediate node 103 transmits in a Step 780 data in another subframe.

The time-frequency region 305 may be divided so that the second part 302 of the time-frequency region 305 is located later in the subframe 310 than the first part 300 of the time-frequency region 305. The first and second parts 300, 302 of the time-frequency region 305 may be separated by a split 315 in time, i e in the time domain, in the subframe 310. The end 320 of the first part 300 of the time-frequency region 305 may be at the split 315 in time between said first and said second parts 300, 302 of the time-frequency region 305. The end 320 of the second part 300 of the time-frequency region 305 may be at the end of the subframe 310.

The split 315 may be a fixed split at a fixed position in the subframe 310 or an adaptable or configurable split, in which case the position in the subframe may be set e g at system configuration.

According to further embodiments the first part 300 may comprise a first set of OFDM symbols that is subsequent to a reserved set of OFDM symbols, for example 1-3 OFDM symbols at the beginning of the subframe 310. The reserved set of OFDM symbols may be used for the control region 200. The second part 302 of the time-frequency region 305 may comprise a second set of OFDM symbols that is subsequent to the first set of OFDM symbols.

The frequency resource used for receiving the control information from the network node 100 may in some embodiments be the frequency resource that is used also for the control signalling to user equipments by the intermediate node 103.

According to further embodiments, the time-frequency region 305 that is located after the control region 200 in the subframe 310 may be a time-frequency region that is used for receiving control channels defined for relay operation. In one example the control channels may be R-PDCCHs and the first and second control information may be signalled or transmitted in the R-PDCCHs.

In some additional embodiments, the first and second control information may be received during a silent period 460 when user equipments 104 connected to the intermediate node 103 do not expect any transmissions from the intermediate node 103. In one example the silent period 460 follows after a control signalling part 415 in an MBSFN subframe 450.

The subframe structure may in further embodiments be time aligned in cells 102 controlled by the network node 100 and cells 102R controlled by the intermediate node 103.

In some embodiments the network node 100 may be a donor eNB and the intermediate node 103 may be a relay node that is wirelessly connected to the radio-access network via a donor cell 102 that is controlled by the donor eNB. In other embodiments, the network node 100 and the intermediate node 103 may be relay nodes wirelessly connected to the radio-access network via a donor cell controlled by a donor eNB. In further embodiments the intermediate node 103 may be a user equipment wirelessly connected to the radio-access network via a donor cell controlled by a donor eNB.

Figure 8:
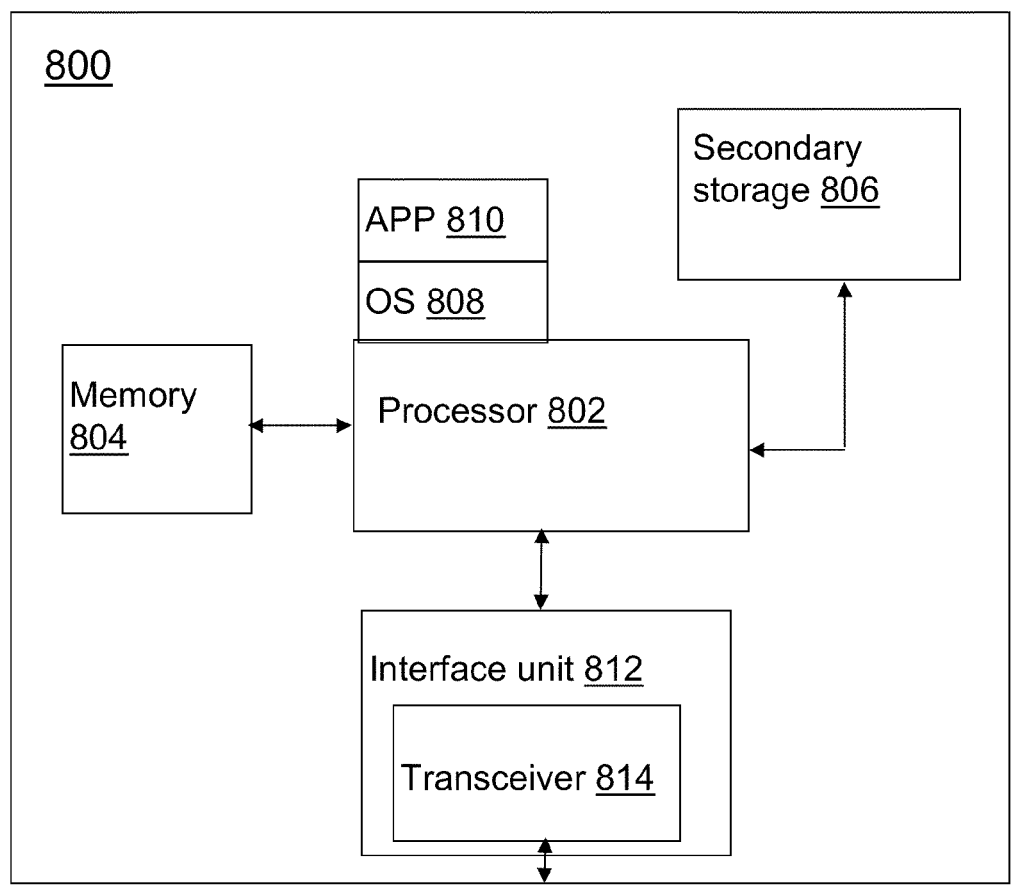
FIG. 8 is a block diagram illustrating an arrangement according to some embodiments of the invention.

To perform the method steps of the above methods for transmitting and receiving control information the network node 100 as well as the intermediate node 103 may be implemented as a node 800 depicted in FIG. 8. The node 800 may further be the UE 104, 105. The node 800, in some embodiments implemented as the UE 104, relay 103 and eNodeB 100 of FIG. 1 can for example be implemented using various components, in hardware and/or software. For example, as shown generally in FIG. 8, such a node 800, for example a UE, relay or eNodeB as mentioned above, can include a processor 802, or multiple processor cores, a memory 804, one or more secondary storage devices 806 e.g., external storage device(s), an operating system 808 running on the processor 802 and using the memory 804, as well as a corresponding application 810. The application 810 may for example be a scheduler application for scheduling of transmissions of control information and data payload and/or a decoder application for decoding of control information and data payload. An interface unit 812 may be provided to facilitate communications between the node 800 and the rest of the network or may be integrated into the processor 802. For example, interface unit 812 can include a transceiver 814 capable of communicating wirelessly over an air interface, e.g., as specified by LTE, including hardware and software capable of performing the necessary modulating, coding, filtering and the like, as well as demodulating and decoding to process such signals, including multiplexing or demultiplexing R-PDCCH data as described above.

As mentioned above, the network node 100 may be implemented as the node 800. The network node 100, 800 comprises a transceiver 814 adapted to transmit control information in a subframe 310 from the network node 100, 800 to the intermediate node 103 in the radio-access network 120. The control information is comprised in the time-frequency region 305 that is transmitted after the control region 200. The control region 200 is transmitted in the beginning of the subframe 310. The control region 200 may be used for control signalling to user equipments 105.

The transceiver 814 is further adapted to transmit first control information in the first part 300 of the time-frequency region 305 and second control information in the second part 302 of the time-frequency region 305. The time-frequency region 305 is divided so that the second part 302 is located later in the subframe 310 than the first part 300. The second control information is less time-critical than the first control information.

The first control information may concern data that is transmitted in the subframe 310. The first control information may in further examples be needed by the intermediate node 103 prior to decoding of data payload in the subframe 310. The first control information may in some embodiments be downlink related information and/or the second control information may be uplink related information. In some examples, the downlink related information may be scheduling assignments and/or the uplink related information may be scheduling grants. According to further embodiments, the uplink related information may be transmitted in the first part 300 if resources are available in the first part 300 that have not been used for downlink related information.

The transceiver 814 in the network node 100 may in some embodiments be adapted to transmit the control information on a frequency resource that is also used for the control signalling to user equipments by the intermediate node 103.

In some additional embodiments, the transceiver 814 in the network node 100 may be adapted to transmit the first and second control information during a silent period 460 when user equipments 104 connected to the intermediate node 103 do not expect any transmissions from the intermediate node 103. In one example the silent period 460 follows after a control signalling part 415 in an MBSFN subframe 450.

The first and second parts 300, 302 of the time-frequency region 305 may be separated by a split 315 in time, i e in the time domain, in the subframe 310. The split 315 may be a fixed split at a fixed position in the subframe 310 or an adaptable or configurable split, in which case the position in the subframe may be set e g at system configuration.

According to further embodiments the first part 300 may comprise a first set of OFDM symbols that is subsequent to a reserved set of OFDM symbols, for example 1-3 OFDM symbols at the beginning of the subframe 310. The reserved set of OFDM symbols may be used for the control region 200. The second part 302 of the time-frequency region 305 may comprise a second set of OFDM symbols that is subsequent to the first set of OFDM symbols.

According to further embodiments, the time-frequency region 305 that is transmitted after the control region 200 in the subframe 310 may be a time-frequency region that is used for transmitting control channels defined for relay operation. In one example the control channels may be R-PDCCHs and the first and second control information may be signalled or transmitted in the R-PDCCHs.

The subframe structure may in further embodiments be time aligned in cells 102 controlled by the network node 100 and cells 102R controlled by the intermediate node 103.

In some embodiments the network node 100 may be a donor eNB and the intermediate node 103 may be a relay node that is wirelessly connected to the radio-access network via a donor cell 102 that is controlled by the donor eNB. In other embodiments, the network node 100 and the intermediate node 103 may be relay nodes wirelessly connected to the radio-access network via a donor cell controlled by a donor eNB. In further embodiments the intermediate node 103 may be a user equipment wirelessly connected to the radio-access network via a donor cell controlled by a donor eNB.

As mentioned in the introduction to the description of FIG. 8 above, the intermediate node 103 may be implemented as the node 800. The intermediate node 103, 800 is adapted to receive control information in a subframe 310 from the network node 100 in the radio-access network 120. The control information is comprised in the time-frequency region 305 that is located after the control region 200 in the subframe 310. The control region 200 is located in the beginning of the subframe (310).

The intermediate node 103, 800 comprises a transceiver 814 adapted to receive the first control information in the first part 300 of the time-frequency region 305 and to receive the second control information in the second part 302 of the time-frequency region 305.

The first control information may concern reception of data that is comprised in the subframe 310. The first control information may in further examples be needed by the intermediate node 103 prior to decoding of data payload in the subframe 310. The first control information may in some embodiments be downlink related information. In some examples, the downlink related information may be scheduling assignments.

The second control information may be less time-critical than the first control information. The second control information may in some embodiments be uplink related information. In some examples, the uplink related information may be scheduling grants. The second control information may concern uplink transmission of data to be comprised in another subframe.

The transceiver 814 is further adapted to receive data payload when the first control information indicates that the subframe 310 comprises data payload to the intermediate node 103.

The transceiver 814 may further be adapted to transmit data in another subframe when the second control information indicates an uplink transmission opportunity for the intermediate node 103.

The transceiver 814 in the intermediate node 103 may in some embodiments be adapted to receive the control information from the network node 100 on a frequency resource that is also used for the control signalling to user equipments by the intermediate node 103.

In some additional embodiments, the transceiver 814 in the intermediate node 103 may be adapted to receive the first and second control information during a silent period 460 when user equipments 104 connected to the intermediate node 103 do not expect any transmissions from the intermediate node 103. In one example the silent period 460 follows after a control signalling part 415 in an MBSFN subframe 450.

The intermediate node 103, 800 further comprises a processor 802 adapted to control transmission and reception by said transceiver 814. The processor 802 is also adapted to decode the first control information. The processor 802 is adapted to start decoding the first control information at or after an end 320 of the first part 300 of the time-frequency region 305.

The processor 802 is further adapted to determine whether the first control information indicates data payload to the intermediate node 103. When the first control information indicates that there is data payload to the intermediate node 103 in the subframe 310, the processor 802 is adapted to decode the data payload. In some embodiments some of the data payload may be decoded during the second part 302 of the time-frequency region 305.

The processor 802 may further be adapted to decode the second control information and to start decoding the second control information at or after an end 330 of the second part 302 of the time-frequency region 305 in the subframe 310. The processor 802 may further be adapted to determine whether the second control information is directed to the intermediate node 103. The second control information may concern uplink transmission of data to be comprised in another subframe.

The time-frequency region 305 may be divided so that the second part 302 of the time-frequency region 305 is located later in the subframe 310 than the first part 300 of the time-frequency region 305. The first and second parts 300, 302 of the time-frequency region 305 may be separated by a split 315 in time, i e in the time domain, in the subframe 310. The end 320 of the first part 300 of the time-frequency region 305 may be at the split 315 in time between said first and said second parts 300, 302 of the time-frequency region 305. The end 320 of the second part 300 of the time-frequency region 305 may be at the end of the subframe 310.

The split 315 may be a fixed split at a fixed position in the subframe 310 or an adaptable or configurable split, in which case the position in the subframe may be set e g at system configuration.

According to further embodiments the first part 300 may comprise a first set of OFDM symbols that is subsequent to a reserved set of OFDM symbols, for example 1-3 OFDM symbols at the beginning of the subframe 310. The reserved set of OFDM symbols may be used for the control region 200. The second part 302 of the time-frequency region 305 may comprise a second set of OFDM symbols that is subsequent to the first set of OFDM symbols.

According to further embodiments, the time-frequency region 305 that is located after the control region 200 in the subframe 310 may be a time-frequency region that is used for receiving control channels defined for relay operation. In one example the control channels may be R-PDCCHs and the first and second control information may be signalled or transmitted in the R-PDCCHs.

The subframe structure may in further embodiments be time aligned in cells 102 controlled by the network node 100 and cells 102R controlled by the intermediate node 103.

In some embodiments the network node 100 may be a donor eNB and the intermediate node 103 may be a relay node that is wirelessly connected to the radio-access network via a donor cell 102 that is controlled by the donor eNB. In other embodiments, the network node 100 and the intermediate node 103 may be relay nodes wirelessly connected to the radio-access network via a donor cell controlled by a donor eNB. In further embodiments the intermediate node 103 may be a user equipment wirelessly connected to the radio-access network via a donor cell controlled by a donor eNB.

The present mechanism for transmitting and receiving control information may be implemented through one or more processors, such as the processor 802 in the node 800 depicted in FIG. 8, together with computer program code for performing the functions of the present solutions for transmitting and receiving control information respectively. The program code mentioned above may also be provided as a computer program product, for instance in the form of a data carrier carrying computer program code for performing the present solutions when being loaded into the node 800. One such carrier may be in the form of a CD ROM disc. It is however feasible with other data carriers such as a memory stick. The computer program code can furthermore be provided as pure program code on a server and downloaded to the node 800 remotely.

The foregoing description of exemplary embodiments provides illustration and description, but it is not intended to be exhaustive or to limit the invention to the precise form disclosed. Modifications and variations are possible in light of the above teachings or may be acquired from practice of the invention.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appended claims.

The invention claimed is:

1. A method in a network node for transmitting control information in a subframe from the network node to an intermediate node in a radio-access network, the method comprising:

transmitting a user equipment (UE) control region at a beginning of a subframe; and transmitting a time-frequency region with control information after the UE control region, the time-frequency region extending until the end of the subframe, the control information including first control information transmitted in a first part of the time-frequency region and second control information transmitted in a second part of the time-frequency region, wherein the time-frequency region is divided so that is divided so that the second part is located later in the subframe than the first part and wherein said second control information is less time-critical than said first control information, the time-frequency region including Relay Physical Downlink Control Channels (R-PDCCHs).

2. A method according to claim 1, wherein said first control information is downlink related information and said second control information is uplink related information.

3. A method according to claim 2, wherein said downlink related information is scheduling assignments.

4. A method according to claim 2, wherein said uplink related information is scheduling grants.

5. A method according to claim 2, wherein said uplink related information is transmitted in said first part if all available resources in said first part have not been used for downlink related information.

6. A method according to claim 1, wherein said first control information concerns data that is transmitted in the subframe.

7. A method according to claim 1, wherein said second control information concerns uplink transmission of data to be comprised in another subframe.

8. A method according to claim 1, wherein said first control information is needed prior to decoding of data payload in the subframe.

9. A method according to claim 1, wherein said first and second parts of the time-frequency region are separated by a split in time.

10. A method according to claim 9, wherein said split is a fixed split.

11. A method according to claim 9, wherein said split is an adaptable or configurable split.

12. A method according to claim 1, wherein said first part comprises a first set of orthogonal frequency division multiplexing (OFDM) symbols subsequent to a reserved set of OFDM symbols used for the UE control region and said second part comprises a second set of OFDM symbols that are subsequent to the first set of OFDM symbols.

13. A method according to claim 1, wherein a frequency resource used for transmitting the control information by said network node is also used for the control signalling to user equipments by said intermediate node.

14. A method according to claim 1, wherein said R-PDCCHs are control channels defined for relay operation.

15. A method according to claim 14, wherein second control information is signalled in the R-PDCCHs.

16. A method according to claim 1, wherein said first and second control information is transmitted during a silent period when user equipments connected to said intermediate node do not expect any transmissions from the intermediate node.

17. A method according to claim 16, wherein the silent period follows after a control signalling part in an Multicast/Broadcast over Single Frequency Network (MBSFN) subframe.

18. A method according to claim 1, wherein a subframe structure is time aligned in cells controlled by said network node and cells controlled by said intermediate node.

19. A method according to claim 1, wherein said network node is a donor eNB and said intermediate node is a relay node wirelessly connected to the radio-access network via a donor cell controlled by the donor eNB.

20. A network node, comprising:
a transceiver adapted to transmit a subframe from the network node to an intermediate node in a radio-access network, the subframe including
a user equipment (UE) control region in a beginning of the subframe, and
a time-frequency region with control information after the UE control region, the time-frequency region extending until an end of the subframe and including Relay Physical Downlink Control Channels (R-PDCCHs), the control information including first control information transmitted in a first part of the time-frequency region and second control information transmitted in a second part of the time-frequency region, wherein the time-frequency region is divided so that the second part is located later in the subframe than the first part and wherein said second control information is less time-critical than said first control information.

21. A network node according to claim 20, wherein said first control information is downlink related information and said second control information is uplink related information.

22. A network node according to claim 21, wherein said downlink related information is scheduling assignments.

23. A network node according to claim 21, wherein said uplink related information is scheduling grants.

24. A network node according to claim 20, wherein said time-frequency region transmitted after the UE control region in the subframe is a time-frequency region used for transmitting control channels defined for relay operation.

25. A network node according to claim 20, wherein said network node is a donor eNB and said intermediate node is a relay node wirelessly connected to the radio-access network via a donor cell controlled by the donor eNB.

26. A network node according to claim 20, wherein said network node and said intermediate node are relay nodes wirelessly connected to the radio-access network via a donor cell controlled by a donor eNB.

27. A network node according to claim 20, wherein said intermediate node is a user equipment wirelessly connected to the radio-access network via a donor cell controlled by a donor eNB.

28. A method in an intermediate node for receiving control information in a subframe from a network node in a radio-access network, the method comprising:
receiving a subframe including
a user equipment (UE) control region located in a beginning thereof, and
a time-frequency region with control information, the time-frequency region being located after the UE control region, including Relay Physical Downlink Control Channels (R-PDCCHs) and extending until an end of the subframe, the control information including first control information transmitted in a first part of the time-frequency region;
decoding the first control information, wherein the decoding starts at or after an end of receiving the first part of the time-frequency region;
when said first control information indicates, to the intermediate node, a presence of data payload in the subframe, receiving and decoding the data payload; and
receiving second control information in a second part of the time-frequency region, the time-frequency region being divided into the first part and the second part, the second part following the first part.

29. A method according to claim 28, the method further comprising the steps of:
decoding the second control information, wherein the decoding of the second control information starts at or after an end of the second part of the time-frequency region in the subframe; and
when said second control information indicates, to the intermediate node, an uplink transmission opportunity, transmitting data in another subframe.

30. A method according to claim 28, wherein said first control information is downlink related information and said second control information is uplink related information.

31. A method according to claim 30, wherein said downlink related information is scheduling assignments.

32. A method according to claim 30, wherein said uplink related information is scheduling grants.

33. An intermediate node adapted to communicate with a network node in a radio-access network, the intermediate node comprising:
a transceiver adapted to receive a subframe including a user equipment (UE) control region located in a beginning thereof and a time-frequency region with control information located after the UE control region, including Relay Physical Downlink Control Channels (R-PDCCHs) and extending until an end of the subframe, the control information including first control information located in a first part of the time-frequency region and second control information located in a second part of the time-frequency region, the time-frequency region being divided into the first part and the second part, the second part following the first part, the transceiver being further adapted to receive data payload when said first control information indicates, to the intermediate node, that the subframe includes the data payload; and
a processor connected to said transceiver and adapted to control transmission and reception by said transceiver, the processor being further adapted to decode the first control information, to start decoding the first control information at or after an end of the first part of the time-frequency region, and to decode the data payload when said first control information indicates, to the intermediate node, that the subframe further includes the data payload.

34. An intermediate node according to claim 33, wherein the processor is further adapted to decode the second control information, and adapted to start decoding the second control information at or after an end of the second part of the time-frequency region in the subframe, and wherein the transceiver is further adapted to, when the second control information indicates an uplink transmission opportunity for the intermediate node, transmit data in another subframe.

\* \* \* \* \*

UNITED STATES PATENT AND TRADEMARK OFFICE
CERTIFICATE OF CORRECTION

| | | |
|---|---|---|
| PATENT NO. | : 8,660,082 B2 | Page 1 of 1 |
| APPLICATION NO. | : 12/820703 | |
| DATED | : February 25, 2014 | |
| INVENTOR(S) | : Parkvall | |

It is certified that error appears in the above-identified patent and that said Letters Patent is hereby corrected as shown below:

On the Title Page, Item (73), under "Assignee", in Column 1, Lines 1-2,
delete "Telefonaktiebolaget L M Ericsson," and
insert -- Telefonaktiebolaget L M Ericsson (publ), --, therefor.

In the Specification

In Column 9, Line 64, delete "eNodeB 102," and insert -- eNodeB 100, --, therefor.

In Column 10, Lines 44-45, delete "MBSFN subframe 310" and insert -- subframe 310 --, therefor.

In Column 13, Line 4, delete "second part 300" and insert -- second part 302 --, therefor.

In Column 13, Line 35, delete "second part 300" and insert -- second part 302 --, therefor.

In the Claims

In Column 18, Line 10, in Claim 1, delete "is divided so that is divided so that" and
insert -- is divided so that --, therefor.

Signed and Sealed this
Eleventh Day of November, 2014

Michelle K. Lee
*Deputy Director of the United States Patent and Trademark Office*